(12) United States Patent
Yasuda (10) Patent No.: US 8,797,595 B2
(45) Date of Patent: Aug. 5, 2014

(54) IMAGE INSPECTION APPARATUS, IMAGE RECORDING APPARATUS, AND IMAGE INSPECTION METHOD

(75) Inventor: Takuya Yasuda, Kyoto (JP)

(73) Assignee: Dainippon Screen MFG. Co., Ltd., Kyoto (JP)

( * ) Notice: Subject to any disclaimer, the term of this patent is extended or adjusted under 35 U.S.C. 154(b) by 196 days.

(21) Appl. No.: 13/542,087

(22) Filed: Jul. 5, 2012

(65) Prior Publication Data
US 2013/0057886 A1 Mar. 7, 2013

(30) Foreign Application Priority Data

Jul. 15, 2011 (JP) ................ P2011-156862

(51) Int. Cl.
*H04N 1/60* (2006.01)
*H04N 1/00* (2006.01)

(52) U.S. Cl.
USPC .......................................... 358/1.9; 358/1.6

(58) Field of Classification Search
CPC ............... H04N 1/00034; G06T 2207/30144; G06T 2207/20068; G06K 15/022
See application file for complete search history.

(56) References Cited

U.S. PATENT DOCUMENTS

| 7,221,486 | B2 * | 5/2007 | Makihira et al. | 358/486 |
| 2004/0066962 | A1 * | 4/2004 | Sasa et al. | 382/141 |
| 2009/0208089 | A1 * | 8/2009 | Probst et al. | 382/145 |
| 2013/0114102 | A1 * | 5/2013 | Yamamoto | 358/1.14 |

FOREIGN PATENT DOCUMENTS

| JP | 10-100412 | 4/1998 |
| JP | 2003-094627 | 4/2003 |

* cited by examiner

*Primary Examiner* — Dov Popovici
(74) *Attorney, Agent, or Firm* — McDermott Will & Emery LLP (57) ABSTRACT

In an image inspection apparatus, a first accumulation part acquires a reference accumulated value distribution by accumulating values of pixels in a reference image arranged in an image recording direction. A second accumulation part acquires an inspection accumulated value distribution by accumulating values of pixels in the inspection image arranged in the image recording direction. A sensitivity correction part performs sensitivity correction wherein a plurality of accumulated values other than a local peak in the inspection accumulated value distribution are corrected so as to relatively approach a plurality of corresponding accumulated values in the reference accumulated value distribution, based on a ratio between the inspection accumulated value distribution from which the local peak has been removed and the reference accumulated value distribution. A comparison part subtracts the reference accumulated value distribution from the inspection accumulated value distribution that has undergone the sensitivity correction to detect a defect.

21 Claims, 9 Drawing Sheets

IMAGE INSPECTION APPARATUS, IMAGE RECORDING APPARATUS, AND IMAGE INSPECTION METHOD

TECHNICAL FIELD

The present invention relates to an image inspection apparatus and image inspection method for inspecting an image recorded on a recording medium, and an image recording apparatus that includes the image inspection apparatus.

BACKGROUND ART

In recent years, high-speed printing such as direct mail printing has been performed using inkjet image recording apparatuses. With such image recording apparatuses, an individual piece of information (so-called variable information) is recorded on a region of a recording sheet, which is roll paper, corresponding to each page. In images recorded by the inkjet image recording apparatuses (hereinafter, referred to as "recorded images"), dot missing may occur due to nozzle clogging caused by adherence of dirt, clusters of dots, or the like. Accordingly, an inspection apparatus for detecting such a defect is installed in the image recording apparatuses.

In the case of defect inspection of a recorded material on which the same image has been repeatedly recorded, the defect inspection is performed such that a sample image is prepared by capturing a recorded image that does not include a defect, and an image obtained by capturing a recorded image of an object to be inspected (hereinafter, referred to as an "inspection image") is compared with the sample image. Acquiring the sample image and the inspection image with a common camera makes it possible to eliminate negative influences such as recording unevenness and variations in light quantity and to obtain the same brightness and resolution, thus enabling the defect inspection to be relatively easily performed. However, in the case where variable information is recorded, a sample image cannot be prepared, and the need arises to compare an inspection image directly with (data of) an original image used in recording. In this case, defect inspection becomes difficult because the original image and the inspection image have different levels of resolution and brightness.

In relation to the defect inspection of a recorded material that includes variable information, with the apparatus for inspecting an ink jet printing part disclosed in Japanese Patent Application Laid-Open No. 2003-94627, inspection target X-axis projection data is generated by integrating pixel values in a predetermined direction in a variable data target image that is an image to be inspected. Furthermore, inspection reference X-axis projection data is generated by integrating pixel values in the same direction in a variable data part-inspection reference image serving as a reference image. In the inspection target X-axis projection data, a positional shift and a magnification error are corrected with respect to the inspection reference X-axis projection data and binarization is performed using a threshold value that approximates 0, as a result of which inspection target zero extraction data is generated. In the inspection reference X-axis projection data as well, positions with a value of 0 are extracted so as to generate inspection reference zero extraction data. Then, zero portions that are common to those in the inspection reference zero extraction data are removed from the inspection target zero extraction data, and as a result, dot missing data is generated. With the apparatus for inspecting an ink jet printing part, dot missing is detected based on the dot missing data.

With the inkjet printer disclosed in Japanese Patent Application Laid-Open No. 10-100412, an identification pattern is printed between a plurality of print images on rotary press paper, and a print problem with the print images is checked by checking the presence or absence of ink drips and dot missing in the identification pattern.

Incidentally, with the method disclosed in Japanese Patent Application Laid-Open No. 2003-94627, in the case of color images, even if dots of one color ink are missing in a color mixed portion, the value obtained by integrating pixel values in that portion does not always increase because of the presence of other color inks, and there are cases in which dot missing cannot be detected. Also, in a portion that has low ink density, even if there is no dot missing, the value obtained by integrating pixel values in the inspection image can easily increase due to the influence of ink landing accuracy, and there is the risk of erroneously detecting a defect. Furthermore, with the inkjet system, even during normal recording, variations can occur due to, for example, individual differences in recording sheet and nozzles. Thus, a threshold value for integrated values, which is used in determining the presence of dot missing, cannot easily be determined.

In the inkjet image recording apparatuses, dot missing appears or disappears in the middle of recording. Thus, even if the presence or absence of defects on the identification pattern is checked as disclosed in Patent Application Laid-Open No. 10-100412, it is difficult to appropriately determine the presence or absence of defects in print images. Furthermore, because it is necessary to print an identification pattern of the same width as print images in the width direction of the rotary press paper, a space for recording an identification pattern is required on top and bottom sides of each page. However, for example, in the case where a pattern is recorded across the perforation between pages on a recording sheet, a space for printing an identification pattern cannot be retained.

SUMMARY OF INVENTION

The present invention is intended for a technique for inspecting an image recorded on a recording medium, and it is a primary object of the present invention to improve the inspection accuracy of image inspection.

An image inspection apparatus according to the present invention includes an image pickup part that acquires an inspection image by capturing a recorded image, a first accumulation part that obtains a reference accumulated value distribution by accumulating values of pixels in a reference image that are arranged in a predetermined image recording direction, the reference accumulated value distribution being a distribution of accumulated values in a direction that is perpendicular to the image recording direction, and the reference image being generated in accordance with data used in image recording, a second accumulation part that obtains an inspection accumulated value distribution by accumulating values of pixels in the inspection image that are arranged in the image recording direction, the inspection accumulated value distribution being a distribution of accumulated values in the direction perpendicular to the image recording direction, a sensitivity correction part that performs sensitivity correction processing on at least one of the inspection accumulated value distribution and the reference accumulated value distribution, and a comparison part that compares the inspection accumulated value distribution and the reference accumulated value distribution after the sensitivity correction processing. The sensitivity correction part performs, on at least one of the inspection accumulated value distribution and the reference accumulated value distribution, sensitivity correction in which a local peak in the inspection accumulated value distribution is removed based on surrounding accumulated values, and then, based on a difference between the inspection accumulated value distribution and the reference accumulated value distribution or a ratio between the inspection accumulated value distribution and the reference accumulated value distribution, a plurality of accumulated values other than the local peak in the inspection accumulated value distribution are corrected so as to relatively approach a plurality of corresponding accumulated values in the reference accumulated value distribution. According to the present invention, it is possible to improve the inspection accuracy of image inspection by comparing the accumulated value distributions after sensitivity correction.

In a preferred embodiment of the present invention, the sensitivity correction part removes the local peak by applying a minimum-value filter and then a maximum-value filter to the inspection accumulated value distribution.

In another preferred embodiment of the present invention, the sensitivity correction part enlarges a region that has a small accumulated value toward a region that has a large accumulated value in the reference accumulated value distribution, and then corrects a plurality of accumulated values other than the local peak in the inspection accumulated value distribution so as to relatively approach a plurality of corresponding accumulated values in the reference accumulated value distribution. Through this, it is possible to reduce the influence of misalignment when comparing the two images.

More preferably, the sensitivity correction part enlarges the region that has a small accumulated value toward the region that has a large accumulated value, by applying a minimum-value filter to the reference accumulated value distribution.

In yet another preferred embodiment of the present invention, the comparison part compares the inspection accumulated value distribution and the reference accumulated value distribution after a maximum-value filter has been applied to the reference accumulated value distribution. Through this, it is possible to reduce the influence of misalignment when comparing the two images.

In yet another preferred embodiment of the present invention, the comparison part excludes an accumulated value in the reference accumulated value distribution that exceeds a predetermined value, from comparison targets. Through this, it is possible to reduce the number of cases where a defect is erroneously detected.

In yet another preferred embodiment of the present invention, the reference image and the inspection image are color images, and the first accumulation part, the second accumulation part, the sensitivity correction part, and the comparison part execute processing for each color component.

The present invention is also intended for an image recording apparatus. The image recording apparatus includes an image recording part that performs non-plate image recording on a recording medium, and the above-described image inspection apparatus for inspecting a recorded image in parallel with the image recording performed by the image recording part.

In a preferred embodiment of the present invention, the image recording part performs image recording by ejecting fine ink droplets from an ejection part, and the ejection part passes through each position in a recording region on the recording medium for only once during image recording.

The present invention is also intended for an image inspection method for inspecting an image recorded on a recording medium.

These and other objects, features, aspects and advantages of the present invention will become more apparent from the following detailed description of the present invention when taken in conjunction with the accompanying drawings.

DESCRIPTION OF EMBODIMENTS

Figure 1:
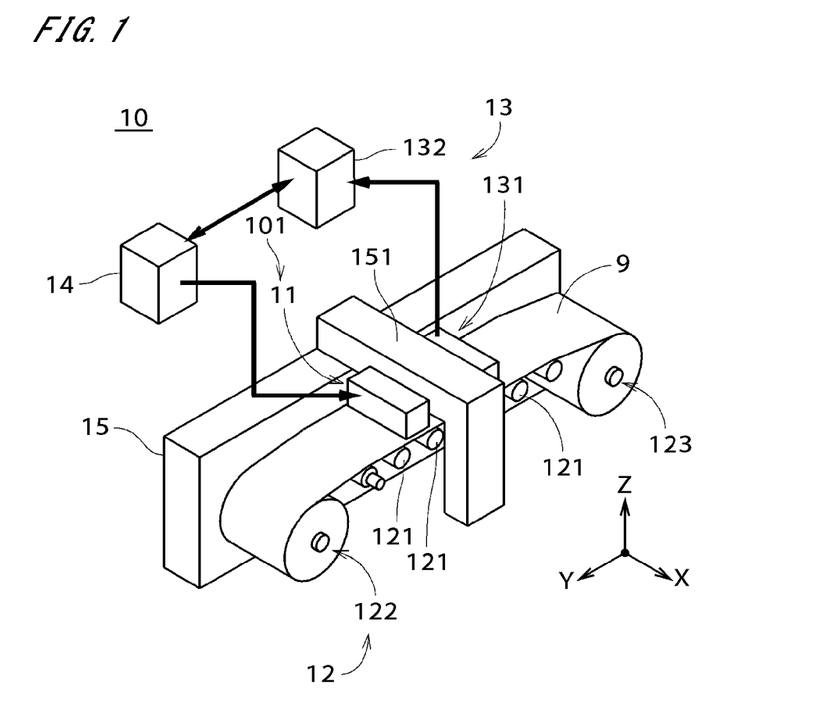
FIG. 1 shows an image recording apparatus.

FIG. 1 is a perspective view showing an external view of an image recording apparatus 10 according to an embodiment of the present invention. The image recording apparatus 10 includes a recording mechanism 11 for performing non-plate image recording on a recording sheet 9 that is web paper, a conveying mechanism 12 for conveying the recording sheet 9, an image inspection apparatus 13 that inspects an image recorded on the recording sheet 9, and a control part 14 that controls these constituent elements. Image recording performed on a recording sheet as a recording medium is so-called non-plate printing. To be more precise, the recording mechanism 11 and the conveying mechanism 12 realize an image recording part 101 that records an image on a recording medium.

In the image recording apparatus 10, recording of an image that includes variable information, i.e., so-called variable printing, is performed, and in parallel with the recording performed by the recording mechanism 11, an image recorded on the recording sheet 9 is automatically inspected. In the following description, an image recorded on the recording sheet 9 is referred to as a "recorded image". In the control part 14, data of an image to be recorded (hereinafter, referred to as an "original image") is rasterized, and thereby, data to be used in recording (hereinafter, referred to as "original image data") is generated. In this way, the control part 14 also functions as an image data generation part.

The conveying mechanism 12 conveys the recording sheet 9 relative to the recording mechanism 11 in the (−Y) direction in FIG. 1. Note that the X, Y, and Z directions in FIG. 1 are perpendicular to one another, and the Z direction corresponds to the vertical direction. In the conveying mechanism 12, a plurality of rollers 121 that are long in the X direction in FIG. 1 are arranged in the Y direction. A supply part 122 that holds a roll of the pre-recording recording sheet 9 and conveys the recording sheet 9 from the roll toward the recording mechanism 11 is provided on the (+Y) side of the plurality of rollers 121. A taking-up part 123 that takes up and holds a recorded portion of the recording sheet 9 in a roll is provided on the (−Y) side of the plurality of rollers 121. In the following description, the recording sheet when simply referred to as the "recording sheet 9" means the recording sheet 9 that is being conveyed (i.e., the recording sheet 9 on the plurality of rollers 121).

Figure 2:
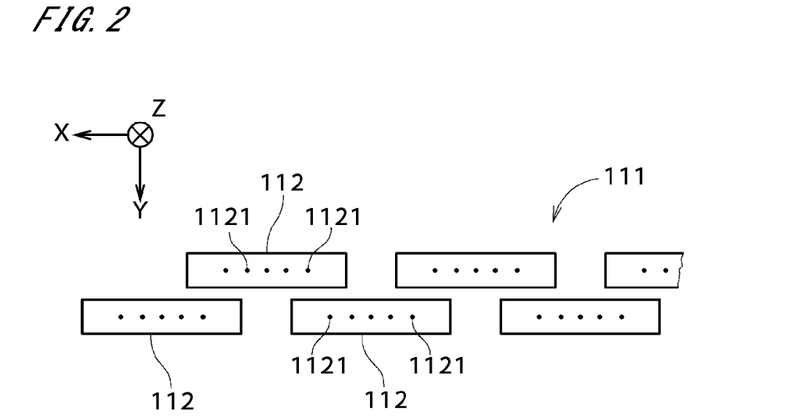
FIG. 2 is a bottom view of an ejection part in a recording mechanism.

The recording mechanism 11 is disposed above the conveying mechanism 12 and fixed to a frame 151 that is provided on a base 15 to straddle over the conveying mechanism 12. FIG. 2 is a bottom view of a single ejection part 111 in the recording mechanism 11. In FIG. 2, the direction of movement of the recording sheet 9 relative to the ejection part 111 (i.e., (−Y) direction) is shown as the upward direction. In reality, the recording mechanism 11 is provided with a plurality of ejection parts that eject color inks of cyan (C), magenta (M), yellow (Y), and black (K), respectively, and the plurality of ejection parts are arranged in the Y direction. The ejection part 111 has a plurality of head parts 112 arranged in a staggered configuration in a direction that is perpendicular to the movement direction of the recording sheet 9 and is parallel to a recording surface of the recording sheet 9 (i.e., X direction in FIGS. 1 and 2, which is a direction corresponding to the width of the recording sheet 9 and hereinafter referred to as a "width direction"). In the bottom face of each head part 112, a plurality of outlets 1121 are formed in an array at a fixed pitch in the width direction.

The head parts 112 are each provided with piezoelectric elements in correspondence with the outlets 1121. By driving the piezoelectric elements, fine ink droplets are ejected from the outlets 1121 toward the recording sheet 9, and thereby, an image is recorded. The distance between each pair of the head parts 112 that are adjacent in the width direction is accurately adjusted, and all the outlets 1121 included in the ejection part 111 are aligned at a fixed pitch along the entire width of a recording region on the recording sheet 9 in the width direction. In the image recording apparatus 10, high-speed recording is performed such that each position in the recording region of the recording sheet 9 passes through under the ejection part 111 for only once. In other words, the image recording apparatus 10 performs so-called single-pass printing. Although the head parts 112 each have only five outlets 1121 in FIG. 2, in reality a large number of outlets 1121 are arranged. The head parts 112 may be of a type that ejects fine droplets by applying heat to inks.

In the image recording apparatus 10, in parallel with the (−Y) direction movement of the recording sheet 9 by the conveying mechanism 12, a color recorded image corresponding to one page is formed on a portion of the recording sheet 9 that corresponds to one page of a recorded material by the control part 14 controlling ink ejection from the head parts 112 of the respective colors in accordance with the original image data of an object to be recorded. In the following description, the (+Y) direction in FIG. 1, which is a direction in which an image is recorded by the recording mechanism 11, i.e., the direction opposite to the movement direction of the recording sheet 9, is referred to as an "image recording direction".

The image inspection apparatus 13 includes an image reading apparatus 131 that reads a recorded image on the recorded recording sheet 9 (i.e., a portion of the recording sheet 9 for which recording has ended), and an image inspection part 132 that inspects the recorded image. The image reading apparatus 131 is located downstream of the recording mechanism 11.

Figure 3:
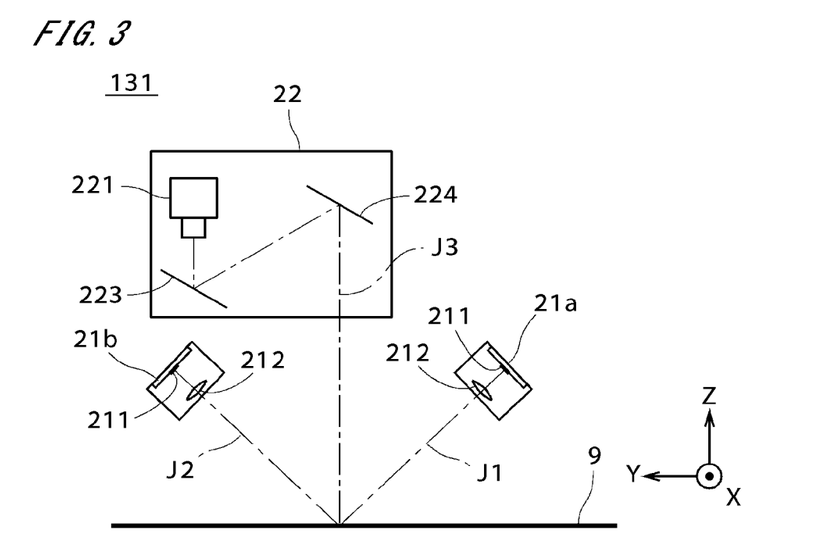
FIG. 3 shows an image reading apparatus.

FIG. 3 is a diagram of the image reading apparatus 131 as viewed from the width direction of the recording sheet 9, showing an internal configuration of the image reading apparatus 131 in a simplified manner. The image reading apparatus 131 includes a first line illumination part 21a, a second line illumination part 21b located on the (+Y) side of the first line illumination part 21a, and an image pickup part 22 located above the first line illumination part 21a and the second line illumination part 21b. The first line illumination part 21a includes a plurality of light emitting diodes 211 arranged in the X direction, and a lens unit 212, and rays of light from the plurality of light emitting diodes 211 are made uniform in the X direction and linearly applied onto the recording sheet 9 along an optical axis J1. Similarly, the second line illumination part 21b includes a plurality of light emitting diodes 211 and a lens unit 212, and rays of light from the plurality of light emitting diodes 211 are made uniform in the X direction and linearly applied to the same position as irradiated by the first line illumination part 21a, along an optical axis J2. The image pickup part 22 captures an image of a linear region that is included in the region irradiated with the light from the first line illumination part 21a and the second line illumination part 21b.

The image pickup part 22 includes a color line camera 221, a first mirror 223, and a second mirror 224. The first mirror 223 has a strip-like shape that is long in the X direction, and is disposed under the color line camera 221. The second mirror 224 also has a strip-like shape that is long in the X direction, and is located on the (−Y) side of the color line camera 221. When the image pickup part 22 captures an image, light from the recording sheet 9 enters the second mirror 224 along an optical axis J3 and is reflected by the second mirror 224 and guided to the first mirror 223. Light reflected by the first mirror 223 enters the color line camera 221.

Figure 4:
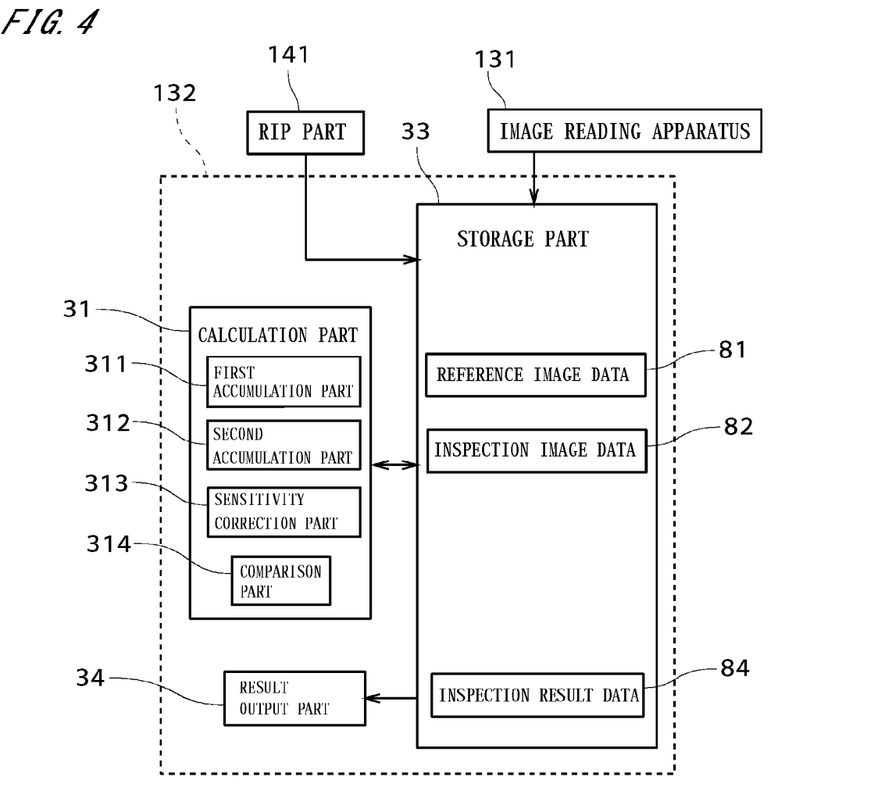
FIG. 4 shows an image inspection part.

FIG. 4 is a block diagram showing a functional configuration of the image inspection part 132. Although in the present embodiment, the image inspection part 132 is realized by a computer and a dedicated electric circuit, the image inspection part 132 as a whole may of course be realized by either a computer or a dedicated electric circuit. The image inspection part 132 includes a calculation part 31 that performs various types of calculation processing, a storage part 33 that stores image data, inspection results, and the like, and a result output part 34 that outputs an inspection result. In FIG. 4, storage devices such as a memory and a hard disk driving device in the image inspection part 132 are collectively shown as the storage part 33. The calculation part 31 includes a first accumulation part 311, a second accumulation part 312, a sensitivity correction part 313, and a comparison part 314. The functions of these parts will be described later.

Figure 5A:
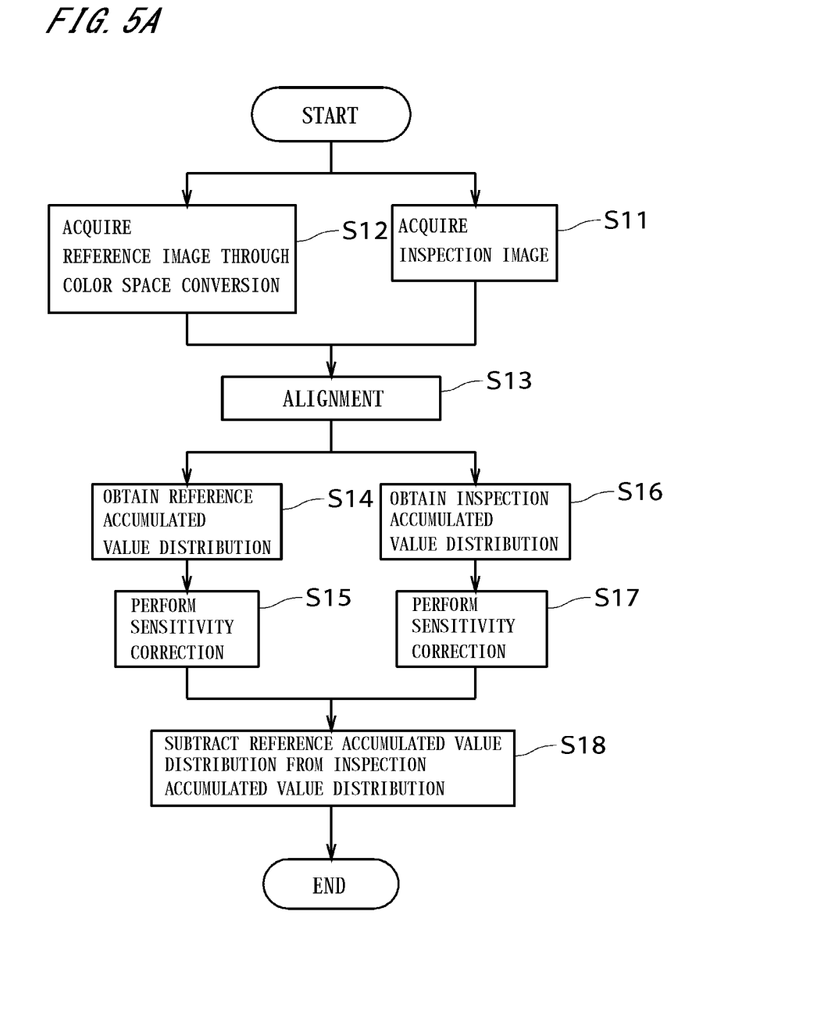
FIG. 5A is a flowchart showing the procedure of defect inspection.
Figure 5B:
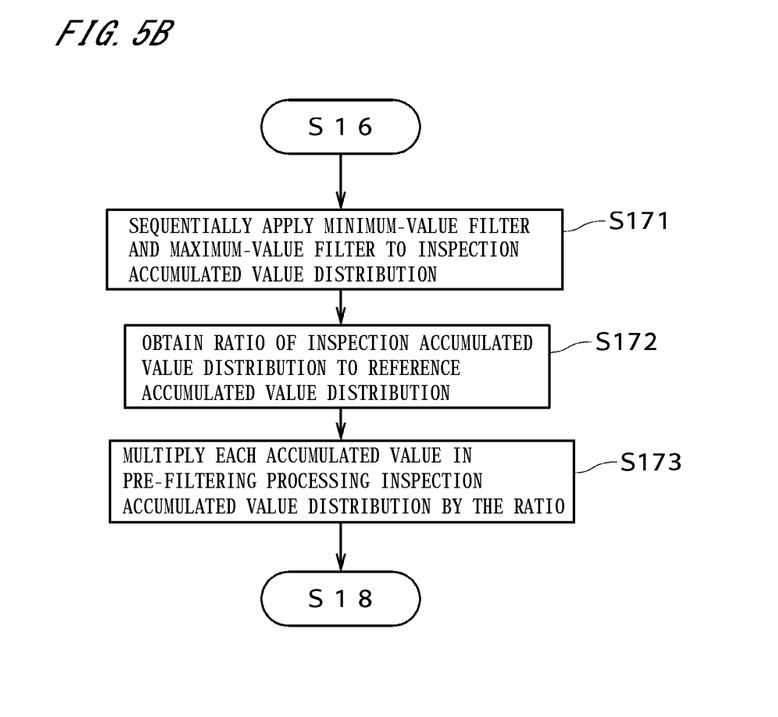
FIG. 5B is a flowchart showing the procedure of defect inspection.

Next is a description of an operation performed by the image recording apparatus 10 for inspecting a recorded image while recording an image on the recording sheet 9. FIG. 5A is a flowchart showing the procedure for inspecting a recorded image, and FIG. 5B is a flowchart showing a detailed procedure of step S17 in FIG. 5A. First, in the control part 14 shown in FIG. 1, original image data is prepared, which is color image data of an object to be recorded. Next, in a raster image processor (RIP) part 141 (see FIG. 4) within the control part 14, original image data in raster format that corresponds to CMYK color space is generated from the original image data in vector format and is transmitted to the recording mechanism 11.

In the image recording apparatus 10, an image is recorded on the recording sheet 9 by the recording mechanism 11 controlling ejection of each color ink in accordance with the original image data while the conveying mechanism 12 continuously moving the recording sheet 9 in the (−Y) direction. Then, a just-recorded image is captured by the image reading apparatus 131 located ahead in the travel direction of the recording sheet 9, i.e., downstream of the recording mechanism 11, so that a color image to be inspected (hereinafter, referred to as an "inspection image") is sequentially acquired (step S11). The inspection image is stored as inspection image data 82 in the storage part 33 shown in FIG. 4.

Meanwhile, in parallel with the recording operation, the original image data is sent from the RIP part 141 in the control part 14 to the image inspection part 132, in which the CMYK color space image data is then converted into RGB color space data. The converted data, i.e., data generated in accordance with the original image data, is stored as data indicating a reference image, which is a color image, (hereinafter, referred to as "reference image data 81") in the storage part 33 as preparation (step S12).

Figure 6:
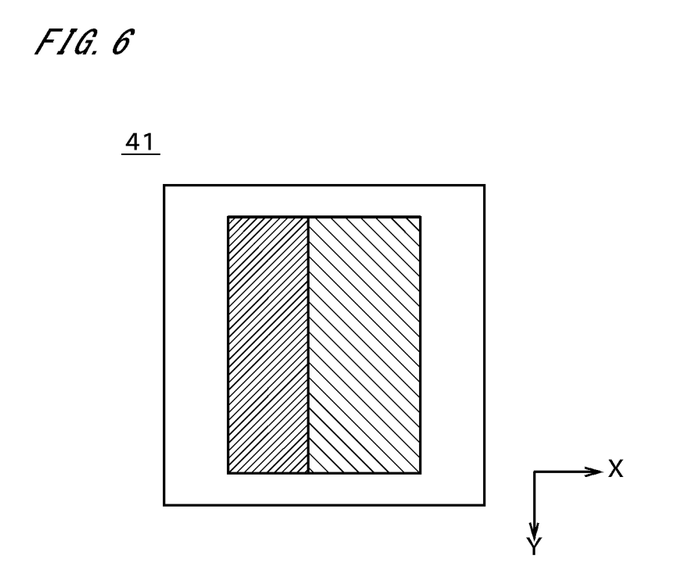
FIG. 6 shows an example of a reference image.
Figure 7:
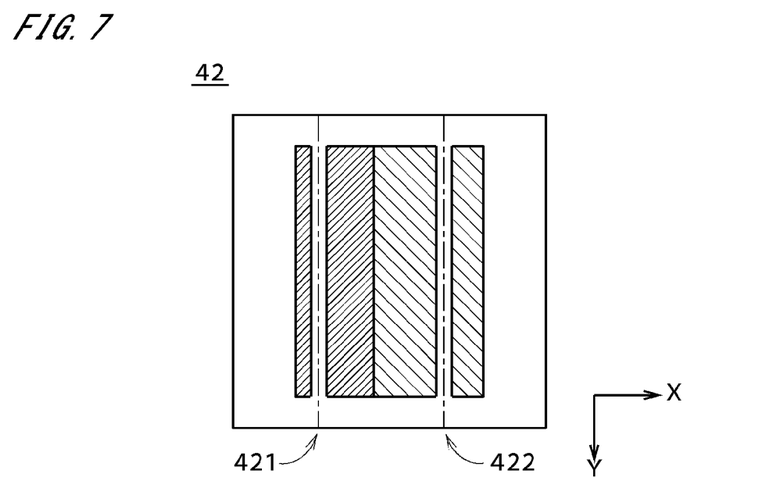
FIG. 7 shows an example of an inspection image.

FIGS. 6 and 7 are diagrams respectively illustrating the reference image and the inspection image. The downward direction in a reference image 41 in FIG. 6 corresponds to the image recording direction. The same applies to FIG. 7 and subsequent similar drawings.

Figure 8:
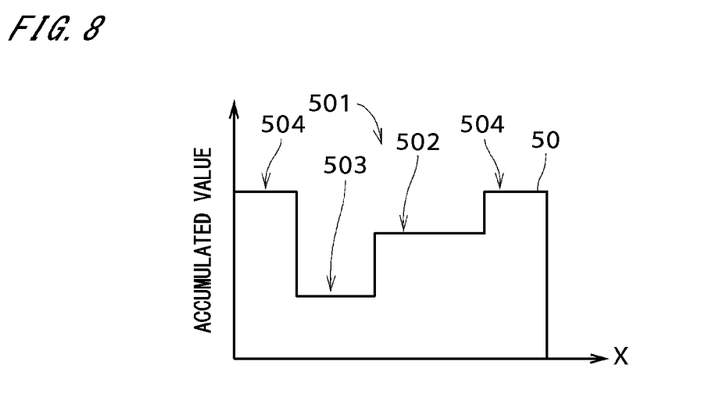
FIG. 8 shows a reference accumulated value distribution.

In the calculation part 31 shown in FIG. 4, the reference image 41 and the inspection image 42 shown in FIGS. 6 and 7 are aligned with each other in the Y direction, which is the image recording direction, and in the X direction perpendicular to the image recording direction (step S13). In the first accumulation part 311, the values of pixels in the reference image 41 that are arranged in the predetermined image recording direction are accumulated so as to obtain a distribution of accumulated values in the X direction as shown in FIG. 8 (step S14). Hereinafter, this distribution is referred to as a "reference accumulated value distribution 50". In order to simplify the description, the reference accumulated value distribution 50 is illustrated in a simplified manner in FIG. 8. The same applies to FIG. 9 and subsequent similar drawings. Furthermore, in reality, the processing performed by the first accumulation part 311 for acquiring the reference accumulated value distribution 50 is executed for each of the RGB color components, and later-described processing performed by the second accumulation part 312, the sensitivity correction part 313, and the comparison part 314 is also similarly executed for each of the RGB color components. However, the following description focuses on only one of the color components.

In the reference image 41 shown in FIG. 6, the values of pixels in a portion that does not include a pattern, i.e., a portion that corresponds to a (white) ground of the recording sheet 9 are large. Furthermore, in a pattern portion, if the brightness of the color component targeted for calculation is low, the values of pixels of that color component are small. In the reference image 41, the brightness of the right-side portion of a diagonally-hatched pattern in FIG. 6 is higher than that of the left-side portion (the same applies to FIG. 7). Thus, among a pattern region 501 that corresponds to the pattern in the reference accumulated value distribution 50 shown in FIG. 8, the accumulated value of a right-side high-brightness pattern region 502 is higher than that of a left-side low-brightness pattern region 503. Naturally, the accumulated value of right- and left-side ground regions 504 in the pattern region 501 is higher than that of the high-brightness pattern region 502. In the sensitivity correction part 313, later-described sensitivity correction processing is performed on the reference accumulated value distribution 50 (step S15).

Figure 9:
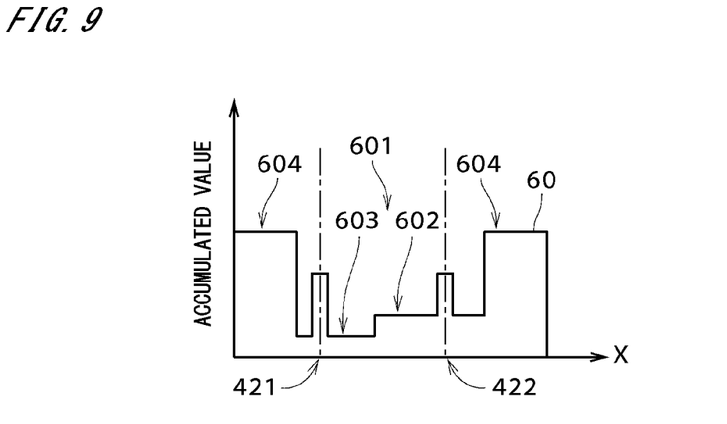
FIG. 9 shows an inspection accumulated value distribution.

In parallel with the generation and sensitivity correction of the reference accumulated value distribution, in the second accumulation part 312, the values of pixels in the inspection image 42 in FIG. 7 that are arranged in the image recording direction are accumulated to obtain a distribution of accumulated values in the X direction (hereinafter, referred to as an "inspection accumulated value distribution 60") as shown in FIG. 9 (step S16). Similarly to the reference image 41, in the inspection image 42, the brightness of the right-side portion in FIG. 7 is higher than that of the left-side portion. Thus, among a pattern region 601 that corresponds to the pattern in the inspection accumulated value distribution 60 shown in FIG. 9, the accumulated value of a right-side high-brightness pattern region 602 is higher than that of a left-side low-brightness pattern region 603. Naturally, the accumulated value of right- and left-side ground regions 604 in the pattern region 601 is higher than that of the high-brightness pattern region 602.

Furthermore, in the inspection image 42 shown in FIG. 7, dot missing due to ink ejection failure has occurred in a pixel column at a position 421 indicated by the dashed dotted line in the left-side low-brightness portion and in a pixel column at a position 422 indicated by the dashed dotted line in the right-side high-brightness portion, and the accumulated values at these positions increases. As shown in FIG. 9, in the inspection accumulated value distribution 60, local peaks appear at the positions 421 and 422 corresponding to the above pixel columns that include defects. In the sensitivity correction part 313, later-described sensitivity correction processing is performed on the inspection accumulated value distribution 60 (step S17).

Figure 10:
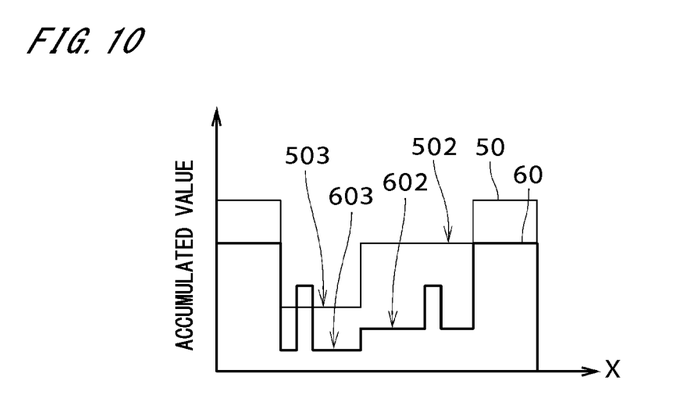
FIG. 10 shows the reference accumulated value distribution and the inspection accumulated value distribution.

FIG. 10 shows the reference accumulated value distribution 50 and the inspection accumulated value distribution 60 that are overlaid on each other, before the sensitivity correction processing is executed. In FIG. 10, the reference accumulated value distribution 50 is indicated by the thin solid line, and the inspection accumulated value distribution 60 is indicated by the thick solid line. The same applies to FIGS. 11, 16, and 19. As shown in FIG. 10, the accumulated values in the inspection accumulated value distribution 60 are generally smaller than those in the reference accumulated value distribution 50. Furthermore, a difference in the accumulated values between the high-brightness pattern region 602 and the low-brightness pattern region 603 in the inspection accumulated value distribution 60 is smaller than that between the high-brightness pattern region 502 and the low-brightness pattern region 503 in the reference accumulated value distribution 50. One conceivable cause of such a phenomenon is that since the reference image 41 has been virtually generated in accordance with the original image data, there is a limit on how much color adjustment can be made at the time of the generation. Moreover, variations in the conditions of inks and the recording sheet 9 used in recording, brightness shifts due to a change in the image pickup part 22, which captures the inspection image 42, over time, and the like are also considered as one of the causes.

Figure 11:
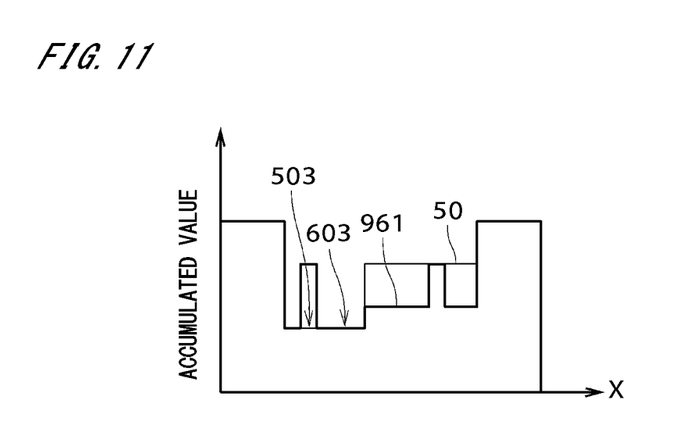
FIG. 11 shows the reference accumulated value distribution and the inspection accumulated value distribution after execution of sensitivity correction processing according to a comparative example.
Figure 12:
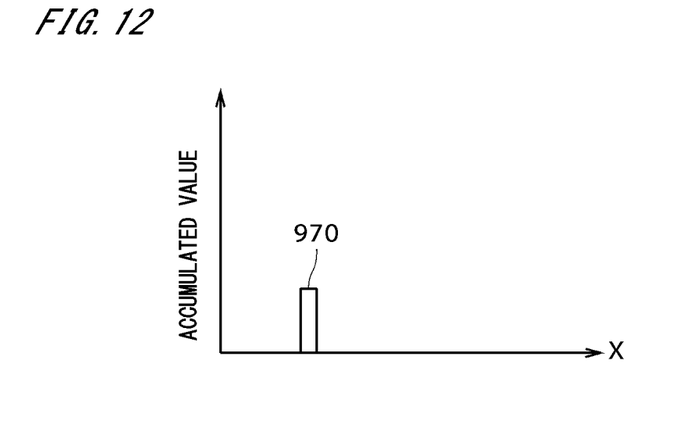
FIG. 12 shows a differential distribution obtained through the sensitivity correction processing according to the comparative example.

Here, it is assumed, for example, that processing different from the sensitivity correction processing according to the present embodiment (hereinafter, referred to as "comparative sensitivity correction processing") is performed, in which an inspection accumulated value distribution 961 is acquired by offsetting the inspection accumulated value distribution 60 such that the low-brightness pattern region 503 in the reference accumulated value distribution 50 and the low-brightness pattern region 603 excluding the local peak in the inspection accumulated value distribution 60 match as shown in FIG. 11. Then, at each position in the X direction, the accumulated value in the reference accumulated value distribution 50 is subtracted from the accumulated value in the inspection accumulated value distribution 961 so as to obtain a differential distribution 970 that is a distribution of differences between the inspection accumulated values and the reference accumulated values, as shown in FIG. 12. Note that in the differential distribution 970, a difference that takes on a negative value is changed to zero. Then, a position in the differential distribution 970 at which a positive value appears is specified as a position where a defect exists.

However, as described above, the difference in the accumulated values between the high-brightness pattern region 602 and the low-brightness pattern region 603 in the inspection accumulated value distribution 60 is smaller than that between the high-brightness pattern region 502 and the low-brightness pattern region 503 in the reference accumulated value distribution 50. Thus, according to the comparative sensitivity correction processing, the local peak at the position 422 (see FIG. 9) in the inspection accumulated value distribution 60 does not appear in the differential distribution 970, and thus it is impossible to detect the dot missing corresponding to that local peak.

Figure 13:
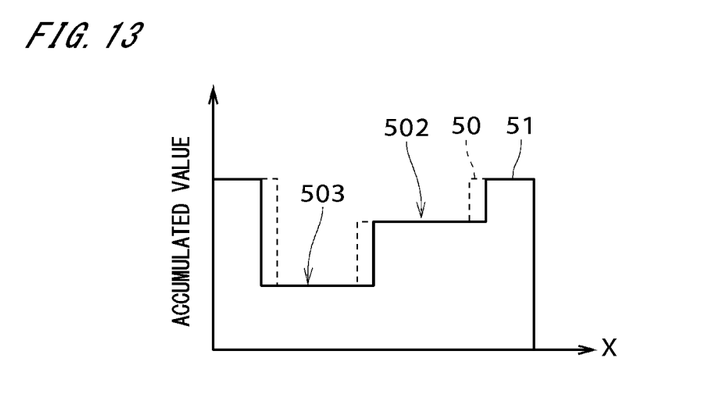
FIG. 13 shows a reference accumulated value distribution.

On the other hand, in the image recording apparatus 10 according to the present embodiment, in the sensitivity correction processing in step S15, filtering processing is performed on the reference accumulated value distribution 50 shown in FIG. 8 by the sensitivity correction part 313 (see FIG. 4). In the filtering processing, a minimum-value filter is applied to the reference accumulated value distribution 50 so as to acquire a reference accumulated value distribution 51 in which each region that has a small accumulated value in the reference accumulated value distribution 50 is enlarged toward a region that has a large accumulated value, as shown in FIG. 13. Specifically, in the reference accumulated value distribution 51, the low-brightness pattern region 503 is enlarged to the right and left, and the high-brightness pattern region 502 is enlarged to the right, as compared to the reference accumulated value distribution 50. In FIG. 13, the reference accumulated value distribution 50 before the minimum-value filter is applied is indicated by the broken line. In later-described FIGS. 14, 15, and 18 as well, the reference accumulated value distribution after the previous processing is indicated by the broken line. Note that FIGS. 13 to 15 and 18 are diagrams that merely illustrate outlines of the processing and do not illustrate accurate processing results.

Figure 14:
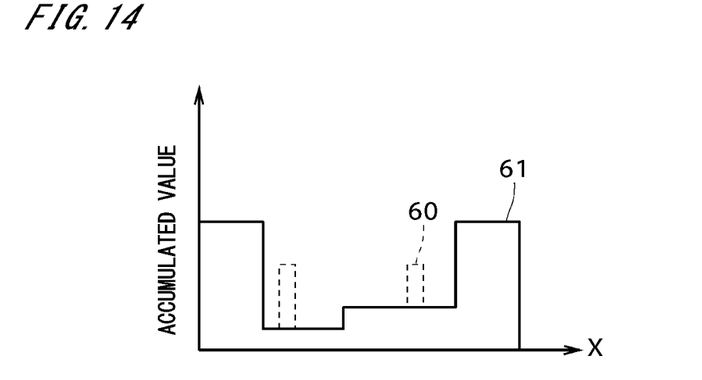
FIG. 14 shows an inspection accumulated value distribution.
Figure 15:
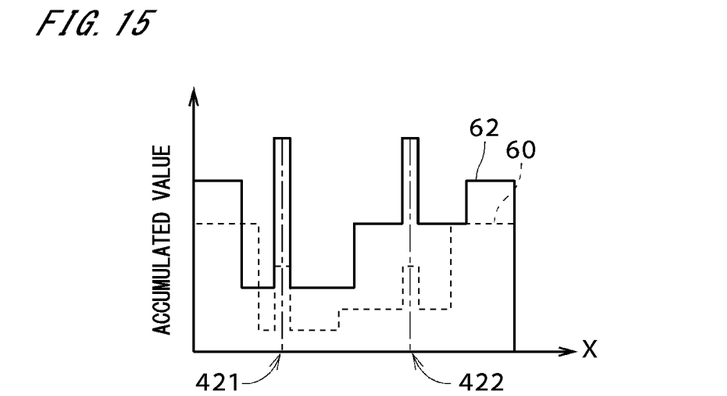
FIG. 15 shows an inspection accumulated value distribution.

Furthermore, in the sensitivity correction processing in step S17, as shown in FIG. 5B, filtering processing is performed on the inspection accumulated value distribution 60 shown in FIG. 9 by the sensitivity correction part 313 (step S171). In the filtering processing, a minimum-value filter and then a maximum-value filter are applied to the inspection accumulated value distribution 60 so as to acquire an inspection accumulated value distribution 61 in which the local peaks in the inspection accumulated value distribution 60 are removed based on surrounding accumulated values, as shown in FIG. 14. The filtering processing in step S171 may be performed in parallel with, or before or after the filtering processing of the reference accumulated value distribution 50 in step S15. However, steps S172 and S173 described below are performed after step S15.

Following this, at each position in the X direction in the inspection accumulated value distribution 61, the ratio of the accumulated value in the inspection accumulated value distribution 61 to that in the reference accumulated value distribution 51 (see FIG. 13) is obtained (step S172). Then, the accumulated value at each position in the inspection accumulated value distribution 60 (see FIG. 9) that has not yet undergone the filtering processing is multiplied by the ratio at that position so as to acquire an inspection accumulated value distribution 62 shown in FIG. 15 (step S173). Note that, at a given position, if the above-described ratio takes on a large value and the multiplication result in step S173 becomes greater than an accumulated value that is obtained when accumulating the values of only pixels in the image recording direction that correspond to the ground portion of the recording sheet 9 (hereinafter, referred to as a "maximum accumulated value"), the accumulated value at that position obtained by the multiplication is converted into the maximum accumulated value. In this way, the sensitivity correction part 313 performs sensitivity correction in which a plurality of accumulated values other than the local peaks in the inspection accumulated value distribution 60 are corrected so as to relatively approach a plurality of corresponding accumulated values in the post-filtering processing reference accumulated value distribution 51, based on the ratio between the post-filtering processing inspection accumulated value distribution 61 and the post-filtering processing reference accumulated value distribution 51.

The sensitivity correction in step S17 may be such that, by dividing the accumulated values in the reference accumulated value distribution 50 by the ratios obtained in step S172, instead of performing the multiplication in step S173, a plurality of accumulated values other than the local peaks in the inspection accumulated value distribution 60 are corrected so as to relatively approach a plurality of corresponding accumulated values in the reference accumulated value distribution 50. In other words, in the sensitivity correction part 313, the sensitivity correction is performed on at least one of the inspection accumulated value distribution 60 and the reference accumulated value distribution 50.

Figure 16:
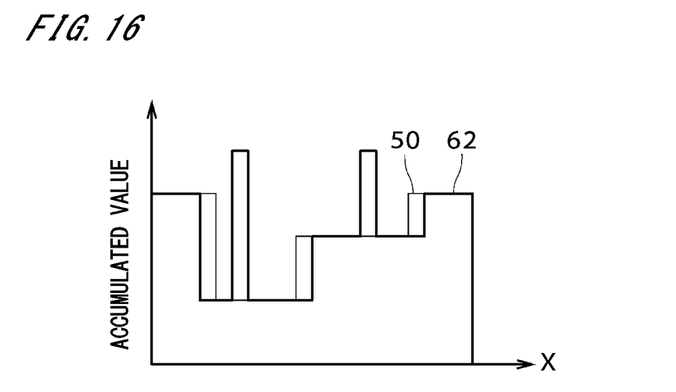
FIG. 16 shows the reference accumulated value distribution and the inspection accumulated value distribution.
Figure 17:
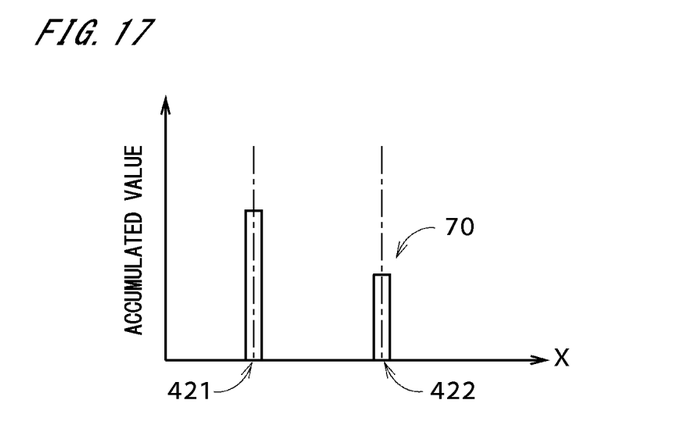
FIG. 17 shows a differential distribution.

When the sensitivity correction processing performed by the sensitivity correction part 313 in steps S15 and S17 has ended, the comparison part 314 subtracts the accumulated value at each position in the X direction in the reference accumulated value distribution 50 from the accumulated value in the inspection accumulated value distribution 62 (step S18). FIG. 16 shows the inspection accumulated value distribution 62 and the reference accumulated value distribution 50. FIG. 17 shows a distribution of differences in the accumulated values between the inspection accumulated value distribution 62 and the reference accumulated value distribution 50, i.e., a differential distribution 70 that is the result of comparison between the inspection accumulated value distribution 62 and the reference accumulated value distribution 50. In the comparison part 314, a difference that takes on a negative value is changed to zero. In the differential distribution 70, positive values appear at the positions 421 and 422 that correspond to the two local peaks in the inspection accumulated value distribution 60 (see FIG. 15), and these positions 421 and 422 are specified as positions where defects exist.

Cyan, magenta, and yellow inks in a recorded image most significantly affect the inspection accumulated value distributions that correspond respectively to their complementary colors, namely, red, green, and blue. In defect inspection, for example, if a differential distribution regarding red includes a positive value at a position in a recorded image at which cyan and magenta inks are applied, it can be estimated that dot missing has occurred in cyan, which absorbs red.

Inspection result data 84 that indicates an inspection result is stored in the storage part 33 shown in FIG. 4 and is output to an operator via the result output part 34 such as a display part. Note that the inspection of the inspection image 42 may be performed in units of several lines, instead of in units of pages. In the image recording apparatus 10, recorded images that correspond to a large number of pages are continuously formed on the recording sheet 9, and in parallel with that recording operation, inspection for defects in a recorded image corresponding to each page is continuously performed by the image inspection apparatus 13, immediately after the image has been formed.

As described above, in the image inspection apparatus 13 of the image recording apparatus 10, the sensitivity correction part 313 performs, on at least one of the inspection accumulated value distribution 60 and the reference accumulated value distribution 50, sensitivity correction in which the local peaks in the inspection accumulated value distribution 60 are removed based on surrounding accumulated values, and then, based on the ratio between the inspection accumulated value distribution 61 and the reference accumulated value distribution 51, a plurality of accumulated values other than the local peaks in the inspection accumulated value distribution 60 are corrected so as to relatively approach a plurality of corresponding accumulated values in the post-filtering processing reference accumulated value distribution 51. Through this, it is possible to correct partial degradation in reproducibility or the like when generating a reference image, and to improve the inspection accuracy as compared to the case of performing the comparative sensitivity correction processing in which the inspection accumulated value distribution (or the reference accumulated value distribution) is uniformly offset.

Furthermore, applying the minimum-value filter and then the maximum-value filter to the inspection accumulated value distribution 60 makes it possible to facilitate the aforementioned removal of the local peaks and to shorten the amount of time required for the removal processing. Moreover, by using the reference accumulated value distribution 50 as a comparison target for the inspection accumulated value distribution 62 that has undergone the sensitivity correction, even if the reference image 41 includes a thin white line extending in the image recording direction or the like as part of the pattern, it is possible to prevent such a white line from being erroneously detected as a defect.

As described above, in step S15, the sensitivity correction part 313 generates the reference accumulated value distribution 51 by enlarging a region in the reference accumulated value distribution 50 that has a small accumulated value toward a region that has a large accumulated value. Thereafter, in steps S172 and S173, the inspection accumulated value distribution 62 is generated by performing sensitivity correction in which a plurality of accumulated values other than the local peaks in the inspection accumulated value distribution 60 are corrected so as to relatively approach a plurality of corresponding accumulated values in the reference accumulated value distribution 51.

This prevents the accumulated values in the inspection accumulated value distribution 62 from being greater than those in the reference accumulated value distribution 50 in portions that correspond to the vicinity of the edges of the pattern portions in the reference image 41, namely, a portion in the vicinity of the boundary between the low-brightness pattern region 503 and the ground region 504, a portion in the vicinity of the boundary between the low-brightness pattern region 503 and the high-brightness pattern region 502, and a portion in the vicinity of the boundary between the high-brightness pattern region 502 and the ground region 504 in the reference accumulated value distribution 50. As a result, even if the reference image 41 and the inspection image 42 are not completely aligned with each other, erroneous detection of defects in the vicinity of the edges of the pattern portions in the reference image 41 can be further prevented. In other words, the sensitivity of the defect detection performed by the comparison part 314 is weakened in the vicinity of the edges, and the influence of misalignment between the two images is reduced. Furthermore, applying the minimum-value filter to the reference accumulated value distribution 50 in step S15 enables easy and quick execution of the processing for enlarging a region that has a small accumulated value toward a region that has a large accumulated value.

In the image inspection apparatus 13, steps S172 and S173 may be replaced by processing for, at each position in the X direction in the inspection accumulated value distribution 61 shown in FIG. 14, obtaining a difference in the accumulated values between the inspection accumulated value distribution 61 and the reference accumulated value distribution 51 (see FIG. 13) and adding the obtained difference at the position to the accumulated value at the corresponding position in the pre-filtering processing inspection accumulated value distribution 60. Specifically, the sensitivity correction processing in which a plurality of accumulated values other than the local peaks in the inspection accumulated value distribution 60 are corrected so as to relatively approach a plurality of corresponding accumulated values in the post-filtering processing reference accumulated value distribution 51 is performed by the sensitivity correction part 313 based on the difference between the post-filtering processing inspection accumulated value distribution 61 and the post-filtering processing reference accumulated value distribution 51.

Figure 18:
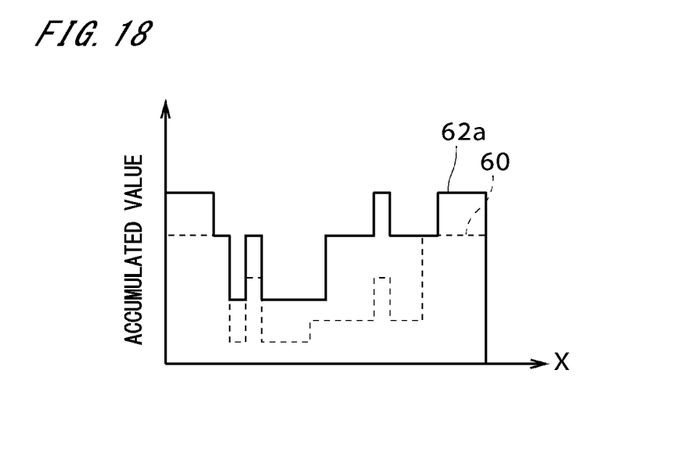
FIG. 18 shows an inspection accumulated value distribution.
Figure 19:
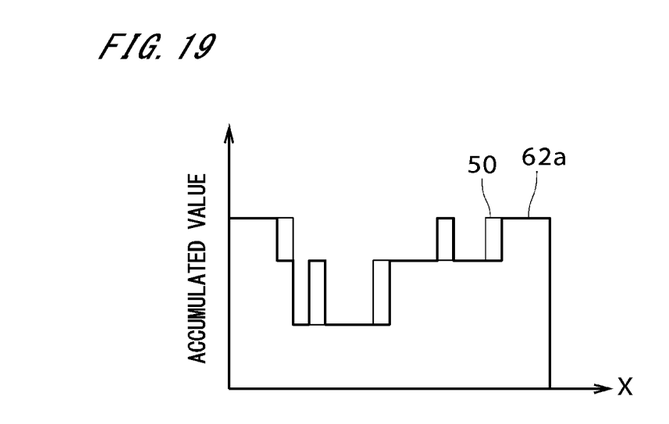
FIG. 19 shows the reference accumulated value distribution and the inspection accumulated value distribution.
Figure 20:
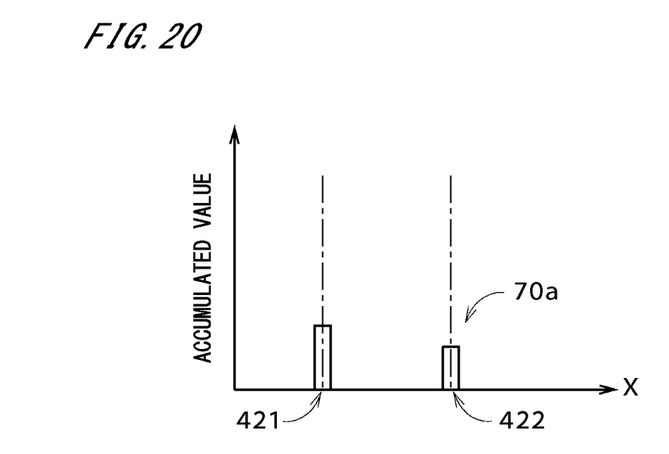
FIG. 20 shows a differential distribution.

FIG. 18 shows an inspection accumulated value distribution 62a that has undergone the above sensitivity correction processing. FIG. 19 shows the inspection accumulated value distribution 62a and the reference accumulated value distribution 50, and FIG. 20 shows a differential distribution 70a that is the result of comparison between the inspection accumulated value distribution 62a and the reference accumulated value distribution 50. As shown in FIG. 20, in the differential distribution 70a as well, positive values appear at the positions 421 and 422 as in the differential distribution 70 shown in FIG. 17, and these positions 421 and 422 are specified as positions where defects exist. In this way, even in the case where the sensitivity correction processing is performed based on the difference between the inspection accumulated value distribution 61 and the reference accumulated value distribution 51, it is possible to correct partial degradation in reproducibility or the like when generating the reference image and to improve the inspection accuracy, as in the case where the sensitivity correction processing of steps S172 and S173 is performed.

Furthermore, in the image inspection apparatus 13, when performing comparison between the reference accumulated value distribution 50 and the inspection accumulated value distribution 62 in step S18, the comparison part 314 may apply a maximum-value filter to the reference accumulated value distribution 50 and then perform the comparison between the reference accumulated value distribution 50 to which the maximum-value filter has been applied and the inspection accumulated value distribution 62. By applying the maximum-value filter to the reference accumulated value distribution 50, a region in the reference accumulated value distribution 50 that has a large accumulated value is enlarged toward a region that has a small accumulated value. This prevents the accumulated values in the inspection accumulated value distribution 62 from being greater than those in the reference accumulated value distribution 50 in portions that correspond to the vicinity of the edges of pattern portions in the reference image 41, during subsequent comparison between the reference accumulated value distribution 50 and the inspection accumulated value distribution 62. As a result, even if the reference image 41 and the inspection image 42 are not completely aligned with each other, erroneous detection of defects in the vicinity of the edges of the pattern portions in the reference image 41 can be even further prevented.

In the image inspection apparatus 13, when performing comparison between the reference accumulated value distribution 50 and the inspection accumulated value distribution 62 in step S18, the comparison part 314 may change accumulated values in the reference accumulated value distribution 50 that exceed a predetermined threshold value to the maximum accumulated value and then perform the comparison between the reference accumulated value distribution 50 and the inspection accumulated value distribution 62. At positions in the reference accumulated value distribution 50 at which the accumulated values have been changed to the maximum accumulated value, the accumulated values in the inspection accumulated value distribution 62 are always smaller than or equal to those in the reference accumulated value distribution 50. As a result, among the accumulated values in the reference accumulated value distribution 50, those that exceed the above threshold value are substantially excluded from the comparison targets.

In the case of a large accumulated value, even if dot missing has occurred at that position, an increase in the accumulated value is limited. Thus, dot missing is difficult to detect or erroneous detection is likely to occur in an X-direction range in which the accumulate values are large. This range can also be a region in which even visual detection of dot missing is difficult. In view of this, in the image inspection apparatus 13, it is possible to easily exclude a bright portion from the comparison targets by performing processing for extracting a dark portion that has a small accumulated value from the reference accumulated value distribution 50, and as a result, to reduce the number of cases where a detect is erroneously detected. Note that, if the processing for applying the maximum-value filter to the reference accumulated value distribution 50 and the processing for changing the accumulated values in the reference accumulated value distribution 50 that exceed the threshold value to the maximum accumulated value, which are described above, are performed in step S18, which processing is performed first is irrelevant. However, from the viewpoint of even further reducing the number of cases where a defect is erroneously detected, it is preferable for the former processing to be performed before the latter.

As described thus far, in the image inspection apparatus 13 of the image recording apparatus 10, the inspection accuracy can be improved by comparing the reference accumulated value distribution 50 and the inspection accumulated value distribution 62 after execution of the above-described sensitivity correction. In the calculation part 31, the accuracy of inspection performed on a color image is improved by acquiring the reference accumulated value distribution and the inspection accumulated value distribution for each of the RGB color components and performing the defect inspection. Furthermore, such dot missing inspection using accumulated values is in particular suitable for single-pass image recording apparatuses in which dot missing significantly affects recording quality.

While the above has been a description of embodiments of the present invention, the present invention is not limited to the above-described embodiments and can be modified in various ways.

For example, the processing performed in step S15, i.e., the processing for performing sensitivity correction on the reference accumulated value distribution 50 so as to acquire the reference accumulated value distribution 51 as shown in FIG. 13 in which each region that has a small accumulated value is enlarged toward a region that has a large accumulated value, does not necessarily have to be realized by applying the minimum-value filter to the reference accumulated value distribution 50, and it may be realized by various other methods. Furthermore, in the case where, for example, there is substantially no need to consider an alignment error between the reference image 41 and the inspection image 42, step S15 may be omitted. In this case, in step S172, the ratios of the accumulated values in the inspection accumulated value distribution 61 shown in FIG. 14 to those in the reference accumulated value distribution 50 are obtained. In addition, the inspection accumulated value distribution 62a shown in FIG. 18 is obtained based on the differences in the accumulated values between the inspection accumulated value distribution 61 and the reference accumulated value distribution 50.

In step S17, the processing for acquiring the inspection accumulated value distribution 61 by removing the local peaks from the inspection accumulated value distribution 60 does not necessarily have to be realized by sequentially applying the minimum-value filter and the maximum-value filter to the inspection accumulated value distribution 60, and it may be realized by various other methods. Moreover, in the above-described sensitivity corrections performed on the reference accumulated value distribution and the inspection accumulated value distribution, appropriate changes can be made to the processing order and the processing method as long as substantially the same content of processing can be performed.

Besides the inkjet image recording apparatuses, the image inspection apparatus 13 may be used in other image recording apparatuses such as electrophotographic image recording apparatuses that perform non-plate image recording, and the recording medium used in the image recording apparatus 10 may be a film- or plate-like member, instead of a recording sheet. Furthermore, the image inspection apparatus 13 may be used to inspect images recorded on various recording media.

The configurations of the above-described embodiments and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention. This application claims priority benefit under 35 U.S.C. Section 119 of Japanese Patent Application No. 2011-156862 filed in the Japan Patent Office on Jul. 15, 2011, the entire disclosure of which is incorporated herein by reference.

REFERENCE SIGNS LIST

9 Recording sheet
10 Image recording apparatus
13 Image inspection apparatus

22 Image pickup part
41 Reference image
42 Inspection image
50, 51 Reference accumulated value distribution
60, 61, 62, 62a Inspection accumulated value distribution
101 Image recording part
311 First accumulation part
312 Second accumulation part
313 Sensitivity correction part
314 Comparison part
S11-S18, S171-S173 Step

The invention claimed is:

1. An image inspection apparatus for inspecting an image recorded on a recording medium, comprising:
an image pickup part that acquires an inspection image by capturing a recorded image;
a first accumulation part that obtains a reference accumulated value distribution by accumulating values of pixels in a reference image that are arranged in a predetermined image recording direction, said reference accumulated value distribution being a distribution of accumulated values in a direction that is perpendicular to said image recording direction, and said reference image being generated in accordance with data used in image recording;
a second accumulation part that obtains an inspection accumulated value distribution by accumulating values of pixels in said inspection image that are arranged in said image recording direction, said inspection accumulated value distribution being a distribution of accumulated values in the direction perpendicular to said image recording direction;
a sensitivity correction part that performs sensitivity correction processing on at least one of said inspection accumulated value distribution and said reference accumulated value distribution; and
a comparison part that compares said inspection accumulated value distribution and said reference accumulated value distribution after said sensitivity correction processing,
wherein said sensitivity correction part performs, on at least one of said inspection accumulated value distribution and said reference accumulated value distribution, sensitivity correction in which a local peak in said inspection accumulated value distribution is removed based on surrounding accumulated values, and then, based on a difference between said inspection accumulated value distribution and said reference accumulated value distribution or a ratio between said inspection accumulated value distribution and said reference accumulated value distribution, a plurality of accumulated values other than said local peak in said inspection accumulated value distribution are corrected so as to relatively approach a plurality of corresponding accumulated values in said reference accumulated value distribution.

2. The image inspection apparatus according to claim 1, wherein
said sensitivity correction part removes said local peak by applying a minimum-value filter and then a maximum-value filter to said inspection accumulated value distribution.

3. The image inspection apparatus according to claim 2, wherein
said sensitivity correction part enlarges a region that has a small accumulated value toward a region that has a large accumulated value in said reference accumulated value distribution, and then corrects the plurality of accumulated values other than said local peak in said inspection accumulated value distribution so as to relatively approach the plurality of corresponding accumulated values in said reference accumulated value distribution.

4. The image inspection apparatus according to claim 3, wherein
said sensitivity correction part enlarges said region that has the small accumulated value toward said region that has the large accumulated value, by applying the minimum-value filter to said reference accumulated value distribution.

5. The image inspection apparatus according to claim 4, wherein
said comparison part compares said inspection accumulated value distribution and said reference accumulated value distribution after the maximum-value filter has been applied to said reference accumulated value distribution.

6. The image inspection apparatus according to claim 5, wherein
said comparison part excludes an accumulated value in said reference accumulated value distribution that exceeds a predetermined value, from comparison targets.

7. The image inspection apparatus according to claim 6, wherein
said reference image and said inspection image are color images, and
said first accumulation part, said second accumulation part, said sensitivity correction part, and said comparison part execute processing for each color component.

8. The image inspection apparatus according to claim 1, wherein
said sensitivity correction part enlarges a region that has a small accumulated value toward a region that has a large accumulated value in said reference accumulated value distribution, and then corrects the plurality of accumulated values other than said local peak in said inspection accumulated value distribution so as to relatively approach the plurality of corresponding accumulated values in said reference accumulated value distribution.

9. The image inspection apparatus according to claim 8, wherein
said sensitivity correction part enlarges said region that has the small accumulated value toward said region that has the large accumulated value, by applying a minimum-value filter to said reference accumulated value distribution.

10. The image inspection apparatus according to claim 9, wherein
said comparison part compares said inspection accumulated value distribution and said reference accumulated value distribution after a maximum-value filter has been applied to said reference accumulated value distribution.

11. The image inspection apparatus according to claim 10, wherein
said comparison part excludes an accumulated value in said reference accumulated value distribution that exceeds a predetermined value, from comparison targets.

12. The image inspection apparatus according to claim 11, wherein
said reference image and said inspection image are color images, and
said first accumulation part, said second accumulation part, said sensitivity correction part, and said comparison part execute processing for each color component.

13. The image inspection apparatus according to claim 1, wherein
said comparison part compares said inspection accumulated value distribution and said reference accumulated value distribution after a maximum-value filter has been applied to said reference accumulated value distribution.

14. The image inspection apparatus according to claim 13, wherein
said comparison part excludes an accumulated value in said reference accumulated value distribution that exceeds a predetermined value, from comparison targets.

15. The image inspection apparatus according to claim 14, wherein
said reference image and said inspection image are color images, and
said first accumulation part, said second accumulation part, said sensitivity correction part, and said comparison part execute processing for each color component.

16. The image inspection apparatus according to claim 1, wherein
said comparison part excludes an accumulated value in said reference accumulated value distribution that exceeds a predetermined value, from comparison targets.

17. The image inspection apparatus according to claim 16, wherein
said reference image and said inspection image are color images, and
said first accumulation part, said second accumulation part, said sensitivity correction part, and said comparison part execute processing for each color component.

18. The image inspection apparatus according to claim 1, wherein
said reference image and said inspection image are color images, and
said first accumulation part, said second accumulation part, said sensitivity correction part, and said comparison part execute processing for each color component.

19. An image recording apparatus comprising:
an image recording part that performs non-plate image recording on a recording medium; and
an image inspection apparatus for inspecting a recorded image in parallel with the image recording performed by said image recording part,
said image inspection apparatus including:
an image pickup part that acquires an inspection image by capturing the recorded image;
a first accumulation part that obtains a reference accumulated value distribution by accumulating values of pixels in a reference image that are arranged in a predetermined image recording direction, said reference accumulated value distribution being a distribution of accumulated values in a direction that is perpendicular to said image recording direction, and said reference image being generated in accordance with data used in the image recording;
a second accumulation part that obtains an inspection accumulated value distribution by accumulating values of pixels in said inspection image that are arranged in said image recording direction, said inspection accumulated value distribution being a distribution of accumulated values in the direction perpendicular to said image recording direction;
a sensitivity correction part that performs sensitivity correction processing on at least one of said inspection accumulated value distribution and said reference accumulated value distribution; and
a comparison part that compares said inspection accumulated value distribution and said reference accumulated value distribution after said sensitivity correction processing,
wherein said sensitivity correction part performs, on at least one of said inspection accumulated value distribution and said reference accumulated value distribution, sensitivity correction in which a local peak in said inspection accumulated value distribution is removed based on surrounding accumulated values, and then, based on a difference between said inspection accumulated value distribution and said reference accumulated value distribution or a ratio between said inspection accumulated value distribution and said reference accumulated value distribution, a plurality of accumulated values other than said local peak in said inspection accumulated value distribution are corrected so as to relatively approach a plurality of corresponding accumulated values in said reference accumulated value distribution.

20. The image recording apparatus according to claim 19, wherein
said image recording part performs the image recording by ejecting fine ink droplets from an ejection part, and
said ejection part passes through each position in a recording region on the recording medium for only once during the image recording.

21. An image inspection method for inspecting an image recorded on a recording medium, comprising the steps of:
a) acquiring an inspection image by capturing a recorded image;
b) obtaining a reference accumulated value distribution by accumulating values of pixels in a reference image that are arranged in a predetermined image recording direction, said reference accumulated value distribution being a distribution of accumulated values in a direction that is perpendicular to said image recording direction, and said reference image being generated in accordance with data used in image recording;
c) obtaining an inspection accumulated value distribution by accumulating values of pixels in said inspection image that are arranged in said image recording direction, said inspection accumulated value distribution being a distribution of accumulated values in the direction perpendicular to said image recording direction;
d) performing sensitivity correction processing on at least one of said inspection accumulated value distribution and said reference accumulated value distribution; and
e) comparing said inspection accumulated value distribution and said reference accumulated value distribution after said step d),
wherein said step d) includes the steps of:
d1) removing a local peak in said inspection accumulated value distribution based on surrounding accumulated values; and
d2) performing, on at least one of said inspection accumulated value distribution and said reference accumulated value distribution, sensitivity correction in which a plurality of accumulated values other than said local peak in said inspection accumulated value distribution are corrected so as to relatively approach a plurality of corresponding accumulated values in said reference accumulated value distribution, based on a difference between said inspection accumulated value distribution and said reference accumulated value distribution or a ratio between said inspection accumulated value distribution and said reference accumulated value distribution.

* * * * *